Patented Jan. 1, 1946

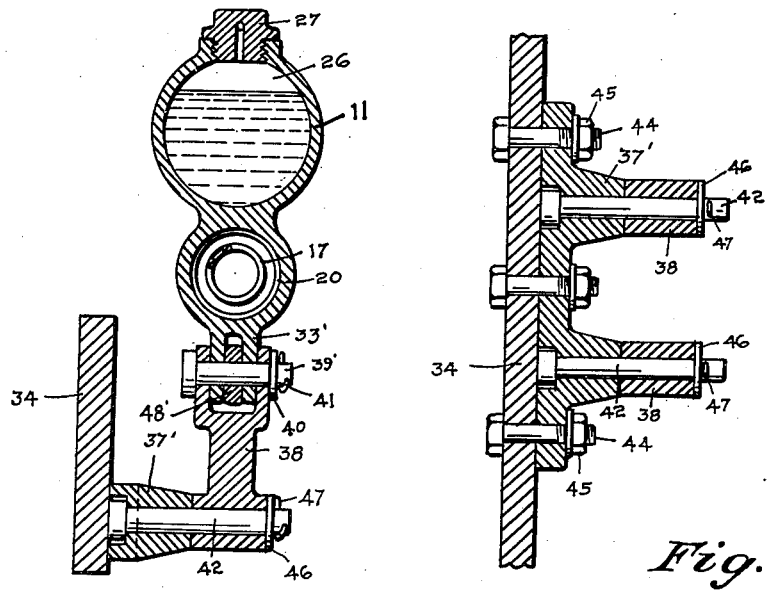
Fig. 3.
Fig. 4.
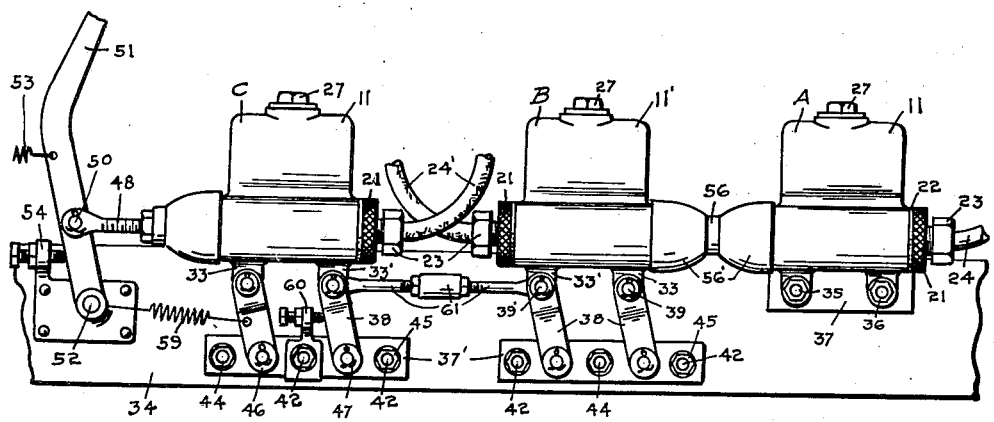
Fig. 5.
INVENTOR:
Malcolm L. Masteller

2,391,913

UNITED STATES PATENT OFFICE 2,391,913

MASTER CYLINDERS

Malcolm L. Masteller, Miami, Fla.

Application June 14, 1943, Serial No. 490,939

5 Claims. (Cl. 60—54.5)

This invention relates to improvements in master cylinders and the object of the improvement is to provide a simple and practical multiple master cylinder device for building up a predetermined relative pressure in plural fluid pressure systems, as for the separate braking of different wheels.

I attain this object by mechanism illustrated in the accompanying drawings to which I now refer:

Figure 3 is a vertical cross section taken on the line 3—3 of Figure 1.

Figure 4 is a horizontal section taken on the line 4—4 of Figure 1.

Figure 5 is a side elevation of triple master cylinders according to the invention.

Like numerals refer to like parts throughout the illustrations.

Figure 1:
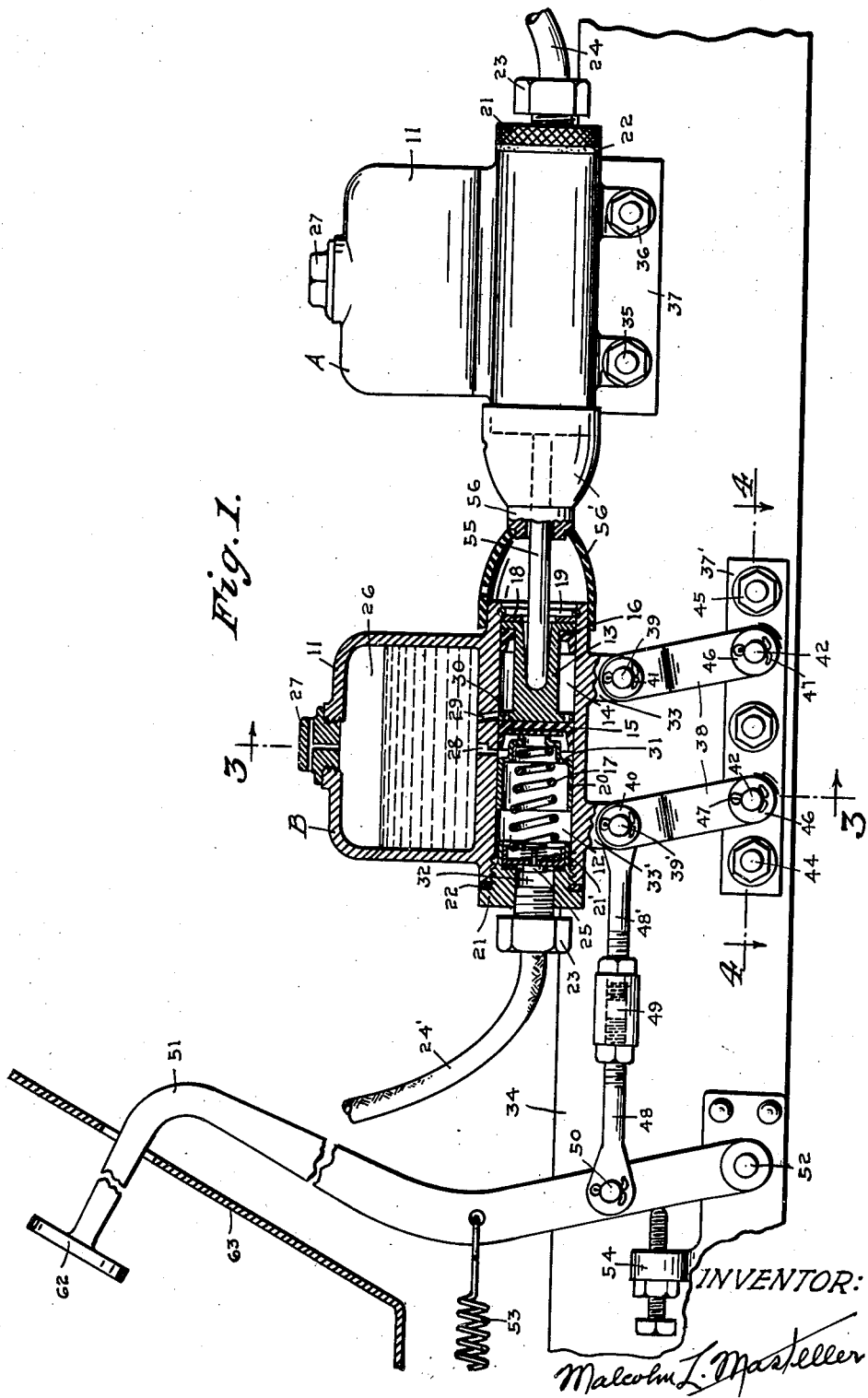
Figure 1 is a side elevation of dual master cylinders and their operating means, one cylinder being broken away and shown in section, according to the invention.

The device of Figure 1 comprises master cylinder A conventionally mounted in fixed position and reciprocating master cylinder B. Each of these master cylinders comprises casing 11, compression chamber 12, compressor piston 13 having an annular recess forming compartment 14 between said piston and said casing, with its primary packing cup 15 and secondary packing cup 16, compression spring 17 urging said piston toward end washer 18 which is held against a shoulder in said casing 11 by retaining ring 19 which in turn is held in an annular groove in casing 11 by its own resilience, running stop member 20, forward end closure 21 with its projection 21' forming a fixed stop, gasket 22, fitting 23 adapted for connecting the conventional conduit 24 or the flexible conduit 24' of the respective fluid pressure systems, the conventional double acting check-valve 25, supply chamber 26 with its vented closure member 27, and all of the conventional passages 28, 29, 30, 31 and 32, also bosses 33—33' by means of which it is mounted on the vehicle chassis member 34; master cylinder A in fixed position supported by bolts 35 and their nuts 36 together with spacing bracket 37; master cylinder B so as to have reciprocal motion in relation to master cylinder A, swinging here on rockers 38 to which it is pivoted by means of pins 39—39' with washers 40 and cotter pins 41.

Each of said rockers 38 is pivoted on a pin 42 which is supported (Figs. 3 and 4) by bracket 37' which is affixed to the chassis member 34 by means of bolts 44 and nuts 45, said rockers being held on pins 42 by washers 46 and cotter pins 47. Operating rod 48—48' with its conventional adjusting means 49 is also pivoted on pin 39' and on pin 50 of operating pedal lever 51 which is fulcrumed at 52 and is provided with extension spring 53 adapted to support it normally resting against the conventional adjustable stop 54. Between the two master cylinders is the common piston rod 55 adapted to operate both pistons, and boot assembly 56—56'.

Figure 2:
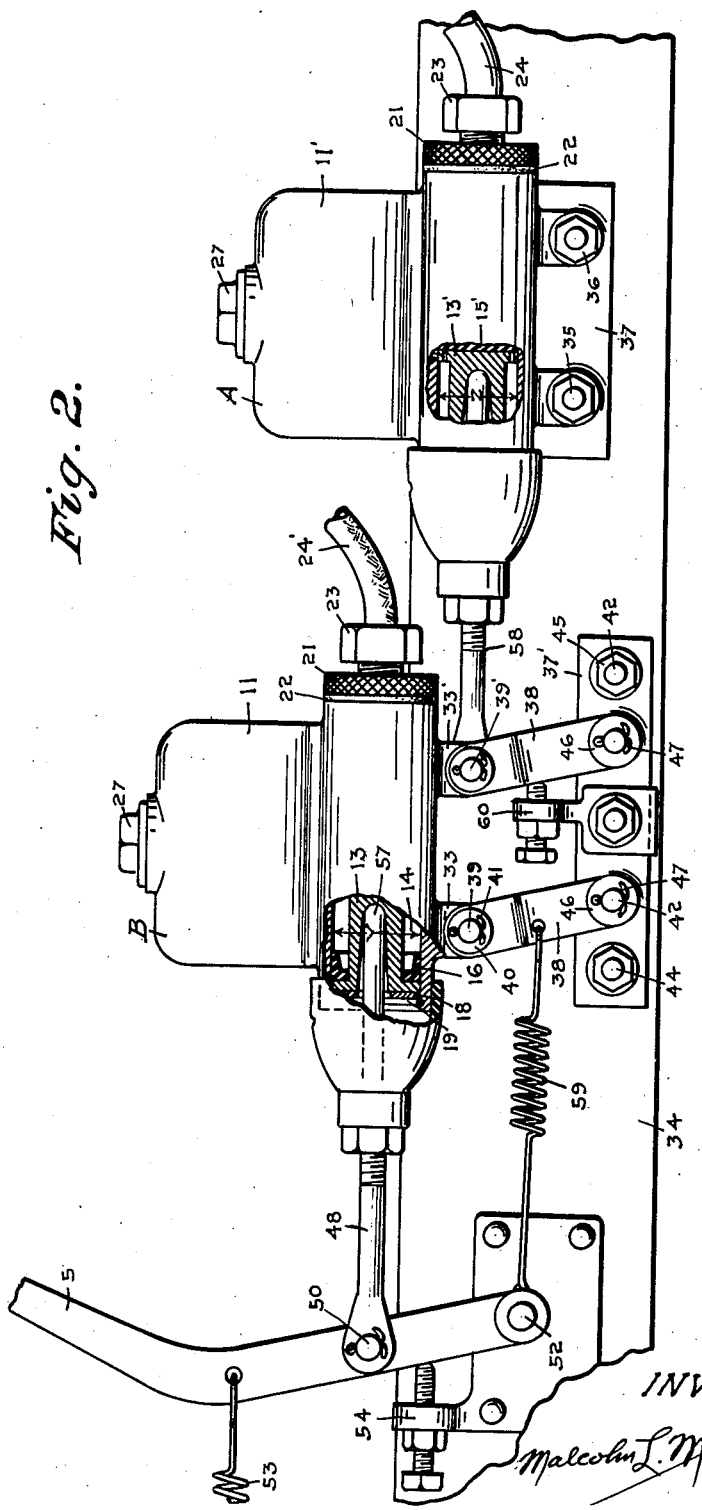
Figure 2 is a side elevation of dual master cylinders in modified form, both cylinders being partly broken away and shown in section, according to the invention.

The device of Figure 2 is the same as that of Figure 1 excepting that master cylinder B is turned around and master cylinder A, whose casing is otherwise designated as 11', has its cylinder, and compressor piston 13' and its packing cups, of lesser diameter than those of master cylinder B, as shown by dimension lines Y—Z of which Z is the shorter, said differential resulting in building up a higher relative pressure in master cylinder A and its respective fluid pressure system. Also in this device operating rod 48 is adjustably attached to piston rod 57 of master cylinder B, and operating rod 58 of master cylinder A is pivoted to pin 39'. In this device there is also provided the extension spring 59 and adjustable stop 60, the latter being associated with bracket 37' and being necessary to a complete release between piston rod 57 and its piston 13.

With dual hydraulic systems it is primarily intended that one of them be associated with the brakes of the front wheels of a vehicle and the other one with the brakes of the rear wheels. Should there be three pairs of braking wheels, either on the vehicle itself or on vehicle and trailer, one pair can be associated with one hydraulic system and two pairs with the other one, or there may be three master cylinders, two reciprocating and one preferably in fixed position. This device is illustrated in Figure 5, it comprising master cylinder A conventionally mounted in fixed position, and dual reciprocating master cylinders B and C joined together by means of adjustable connecting rod 61 so that they reciprocate as one. Extension spring 59 and adjustable stop 60 are used here, and master cylinder B is here illustrated as of type 11', all as described in the preceding paragraph.

In operation (Fig. 1) when pedal lever 51 is thrust forward, master cylinder B moves forward and its approach to master cylinder A causes piston rod 55 to move both pistons forward in their respective cylinders, thereby discharging liquid from them into the conduits 24—24' of the respective fluid pressure systems, and an equalized pressure is built up in them.

In operation (Fig. 2) when pedal lever 51 is thrust forward, piston 13 of master cylinder B is likewise thrust forward and as fluid pressure is built up in said master cylinder B, this in turn moves said master cylinder forward, together with operating rod 58 and piston 13' of master cylinder A, with the same result as described above in regard to the device of Figure 1, excepting that a predetermined variation in the pressures of the respective systems will be maintained.

In operation (Fig. 5). This device is merely a different combination of the same elements as above described in regard to Figures 1 and 2 and no further description is thought to be necessary excepting to state that operating power and motion is here transmitted from master cylinder to master cylinder by the new element here introduced, viz: adjustable connecting rod 61.

In any of these combinations the pressure applied by the operator upon the first compressor will simultaneously and with predetermined ratios become effective upon the balance of them without any additional effort, an without any greater movement than would be required to perform the same braking with a single master cylinder.

If there is no fluid pressure in a given system, the respective piston 13—13' will advance the full length of its range when its running stop member 20 will engage fixed stop 21', thereby preserving the integrity of the rest, the combined ranges of the several pistons being in no case greater than that of operating rod 48 as limited by the maximum movement of pedal 62 to the floor board 63.

What I claim is:

1. In plural master cylinders for controlling plural fluid pressure systems, including means for protecting the integrity of one system in case of failure of another, the combination of a cylinder, having an open end and a closed end, mounted in fixed position, a second cylinder having an open end and a closed end and adapted for longitudinal reciprocal motion in relation to said first cylinder, a piston slidable in said first cylinder and a piston slidable in said second cylinder, and means including the reciprocal motion of said second cylinder for simultaneously advancing said pistons in their respective cylinders.

2. The device of claim 1 in which there is a variation in the diameters of the respective cylinders.

3. Plural master cylinders for controlling plural fluid pressure systems, comprising a cylinder having an open end and a closed end, a second cylinder having an open end and a closed end and adapted for longitudinal reciprocal motion in relation to said first cylinder, a piston slidable in said first cylinder, a piston slidable in said second cylinder, a common means operable upon both of said pistons for simultaneously advancing them in their respective cylinders when said reciprocating cylinder is thrust upon said common means, and means for effecting said thrust.

4. The device of claim 3 in which said common means is a piston rod common to both pistons.

5. Dual master cylinders including a master cylinder adapted for reciprocal motion in relation to said other master cylinder, each comprising a cylinder having a closed end and an open end, a piston slidable within one of said cylinders and a piston rod for its operation, a piston slidable within the other of said cylinders and a piston rod for its operation, and means for operating said rods including a lever operable upon the rod in the reciprocating master cylinder causing it to advance and means connecting said reciprocating master cylinder to said other piston rod to operate said other piston.

MALCOLM L. MASTELLER.